United States Patent [19]

Ward

[11] 4,196,079
[45] Apr. 1, 1980

[54] PLEATED FILTER UNDERDRAIN, METHOD AND APPARATUS

[75] Inventor: Thomas D. Ward, Mineral Wells, Tex.

[73] Assignee: Harsco Corporation, Wormleysburg, Pa.

[21] Appl. No.: 974,424

[22] Filed: Dec. 29, 1978

[51] Int. Cl.² ............................................. B01D 23/18
[52] U.S. Cl. ........................................ 210/80; 210/82; 210/274
[58] Field of Search ............... 210/274, 275, 277, 288, 210/293, 80, 82

[56] References Cited

U.S. PATENT DOCUMENTS

| Re. 28,458 | 7/1975 | Ross | 210/293 |
|---|---|---|---|
| 1,794,841 | 3/1931 | Elfreth | 210/277 |
| 3,202,286 | 8/1965 | Smit | 210/293 |
| 3,282,432 | 11/1966 | Greenleaf, Jr. | 210/275 |
| 3,613,888 | 10/1971 | Hums | 210/275 |
| 3,840,117 | 10/1974 | Ross | 210/274 |
| 3,956,134 | 5/1976 | Sturgill | 210/275 |
| 4,076,625 | 2/1978 | Scholten et al. | 210/274 |
| 4,118,322 | 10/1978 | Roman | 210/274 |

Primary Examiner—Theodore A. Granger
Attorney, Agent, or Firm—Cameron, Kerkam, Sutton, Stowell & Stowell

[57] ABSTRACT

A method and apparatus for air scouring a layered filter bed wherein the air is dispersed into the finer particles of the bed without disturbing the coarse large aggregate in the lower portion of the bed to prevent inter-mixing of the fine aggregate with the large aggregate. The filter support generally comprises a corrugated filter support forming channels having peaks to provide air channels for distribution of air into air ducts communicating with the fine particles of the filter bed. The valleys between the peaks provide an area for the coarse large aggregate of the filter bed such that the filtered liquid flows through the upper portion of the bed and into the large aggregate and out outlet apertures in the filter support into the lower portion of the channels formed by the filter support.

8 Claims, 8 Drawing Figures

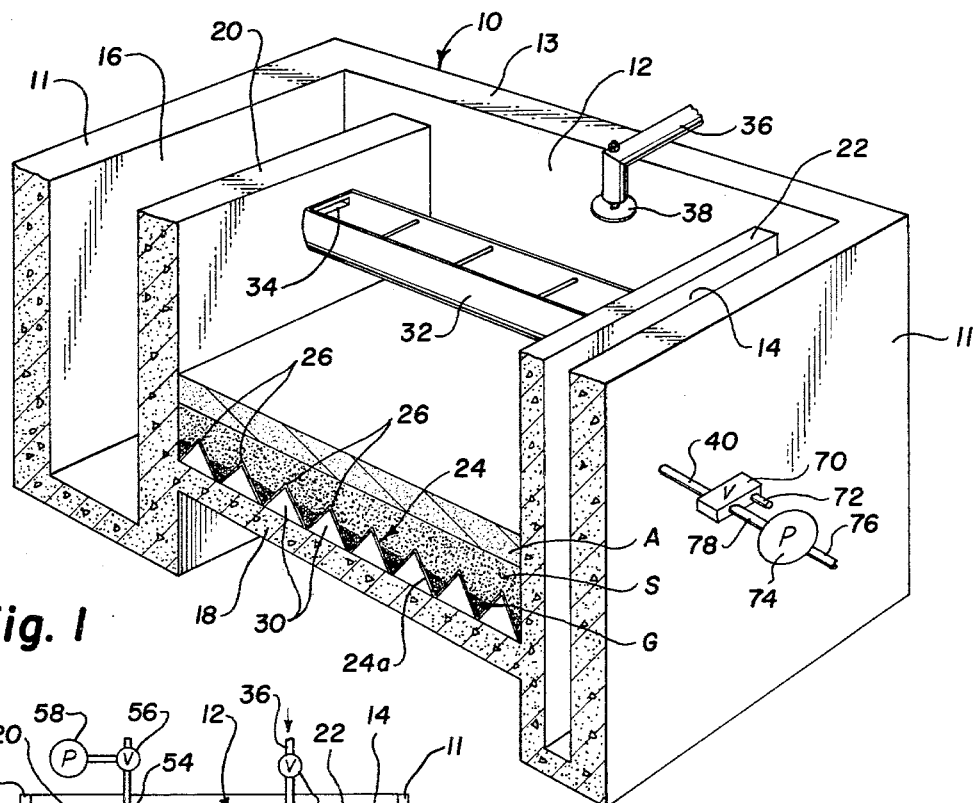
Fig. 1
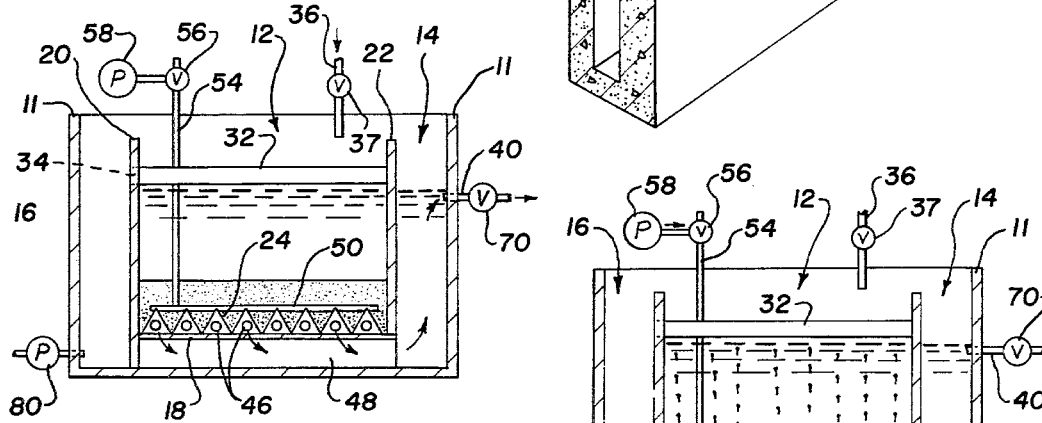
Fig. 2
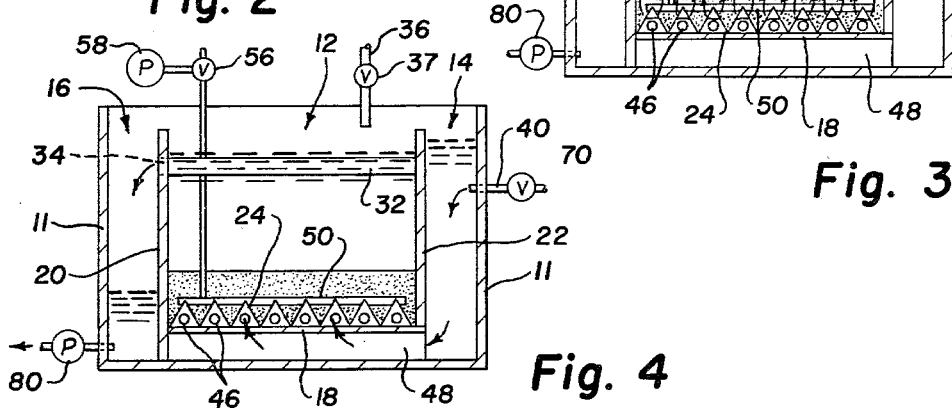
Fig. 3
Fig. 4

PLEATED FILTER UNDERDRAIN, METHOD AND APPARATUS

BACKGROUND

Filter beds for use in moving suspended solids from water supplies to meet present day requirements for potable water and waste effluent quality generally use a layered filter bed generally comprised of a graded sand and gravel media having gravel at the lowermost position, and the sand, anthracite coal and other fine media layered on top. The particles suspended in the liquid are filtered as the fluid flows through the filter bed and into an underdrain system to a storage tank. The filter becomes clogged or ladened with waste particles after a predetermined time and must be cleaned. The clogged bed requires back washing which comprises the steps of forcing water back through the filter bed in order to float the particles to the upper surface of the filter tank and remove them for further treatment. A further effective method is to air scour the filter prior to backwashing which agitates the sand and fine media to move the foreign particles into suspension in the liquid in the filter bed. However, if a gravel layer is used at the lowermost level, it is undesirable to use an air scour which moves through the gravel since this would tend to allow the fine sand to sift into the gravel and settle in the collection orifices of the filter support panel.

U.S. Pat. Nos. 3,110,667; 4,065,391; 3,613,888; 2,710,692; and 3,831,761 disclose filter support underdrains which allow water backwashing. These structures disclosed in these references do not provide for separation of the gravel and sand such that air may be disposed within the sand only thereby not disturbing the gravel.

SUMMARY OF THE INVENTION

I have devised an improved filter underdrain system which allows air scouring in the backwash cycle of the fine filter particles such as sand without disturbing the larger granular filter media.

The filter underdrain generally comprises a corrugated support structure forming peaks and valleys. The larger granular filter media such as gravel is disposed in the lower portion of the valleys approximately two-thirds of the way up the peak wall. The finer filter media such as sand is disposed above the gravel in contact with the upper third of the peak wall of the filter support underdrain. The peaks of the filter support form air channels through which pressurized air is dispensed during the cleaning cycle to air scour the sand through openings in the upper portion of the peaks which communicate with the area of the layer of sand. Drainage apertures are formed in the lower portion in the gravel through which the filtered media flows into the lower portion of the channels and into liquid storage facilities. The peaks of the pleated filter support communicate with pressurized air supplied through an air conduit from above the peaks.

Hoods are secured over air outlet orifices formed in the upper peaks of the filter. A fine screen such as steel wool, is packed in the hoods to prevent the sand from entering the orifices into the lower channel which would allow escape of the filter media and possibly damage the filter underdrain.

Liquid to be filtered is delivered above the filter and allowed to flow through the filter media. The filtered liquid then flows into the hollow portion of the channels from outlet orifices formed in the support structure adjacent the gravel layer of the filter media wherein the filtered media is transferred to a storage tank.

When it is necessary to backwash and remove an excess of foreign particles from the filter media, the filtered liquid is delivered back through the lower channels to flow in a reverse direction. Prior to or simultaneously with the initiation of backwash, pressurized air is delivered through a conduit communicating with a manifold which communicates with each of the channels of the filter support structure. Air is delivered into the upper portion of the corrugated filter support and is evenly distributed along the peak of the channel through ports formed in the upper portion of the channels into the sand to scour the sand. The air exists through the hood and causes the particles to become suspended and float to the top where the particles are collected by a backwash trough and dumped into a mud tank.

A primary object of the invention is to provide a filter underdrain structure which allows air scouring of the fine filter particulate without disturbing a coarser granular gravel in the lower portion of the filter bed.

A further object of the invention is to provide an air distribution system which evenly distributes the air throughout the length of the filter bed to give a controlled air scour in the backwash cycle of cleaning the filter.

A further object of the invention is to increase the amount of pressure which is necessary to backwash in the filter.

A still further object of the invention is to provide structure which eliminates the flow of filter particles into the filtering outlet orifices which causes interior clogging of the filter underdrain and thereby causes structural damage to the filter.

A still further object of the invention is to provide an air relief system which prevents air binding of the filter bed and loss of efficiency in filtering.

Other and further objects of the invention will become apparent upon studying the detailed description hereinafter following and the drawings annexed hereto.

BRIEF DESCRIPTION OF THE DRAWINGS

Drawings of a preferred embodiment of the invention are annexed hereto so that the invention may be better and more fully understood, in which:

FIG. 1 is a perspective sectional view showing the underdrain within a filter bed;

FIG. 2 is a diagrammatic illustration showing the filtering process;

FIG. 3 is a diagrammatic view showing the air backwash process;

FIG. 4 is a diagrammatic view showing the water backwash process;

Numeral references are used to designate like parts throughout the various figures of the drawings.

DESCRIPTION OF A PREFERRED EMBODIMENT

Figure 5:
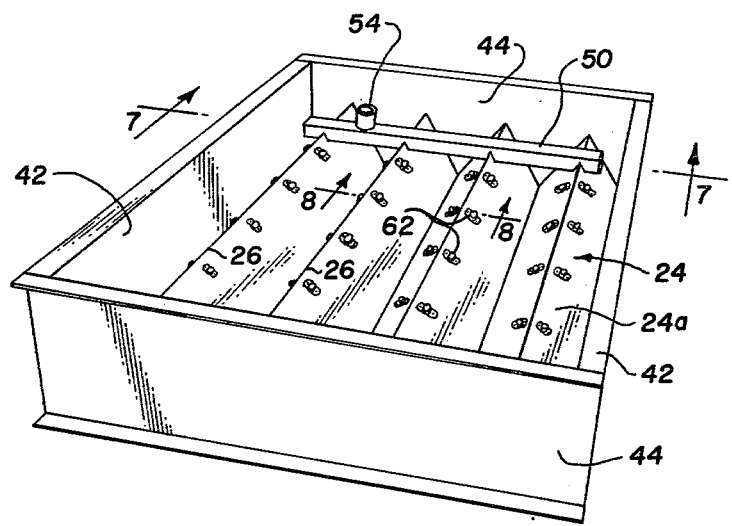
FIG. 5 is an upper perspective view of the filter disconnected from the filter system.

Referring to FIG. 1 of the drawings, numeral 10 generally designates the filter tank having a central inlet tank 12, a collection channel 14, and a mud channel 16.

The tank 10 generally has sidewalls 11, end walls 13, and a bottom 18 with inner walls 20 and 22.

The bottom 18 supports the filter underdrain 24 which generally comprises a corrugated structure having peaks 26 and valleys 28 which form a plurality of parallel channels 30. The filter bed is generally comprised of multiple layers of graded filter media. The first layer, or the lowermost layer generally may be comprised of a coarse material such as gravel G, the gravel is preferably positioned between peaks 26 of underdrain 24 approximately two-thirds the way up the peak walls 24a. The second layer is generally comprised of a finer material such as sand S and is positioned between and above peaks 26 over gravel 6. Other layers may be added which may be composed of graded particles such as anthracite A or ground fired clay. It should be appreciated that layers composed of other materials may be employed without departing from the spirit of the invention.

A backwash trough 32 is secured between walls 20 and 22 of inner tank 12 to collect backwash waste. Backwash waste collected by trough 32 flows through passage 34 into the mud channel 16. An inlet conduit 36 is provided to allow flow of liquid into the inner tank 12. A deflection plate 38 deflects the influent to prevent washing of the filter bed. An outlet conduit 40 communicates through the wall of tank 10 with collection channel 14 such that filtered effluent is stored in a holding tank for future use or release.

Figure 6:
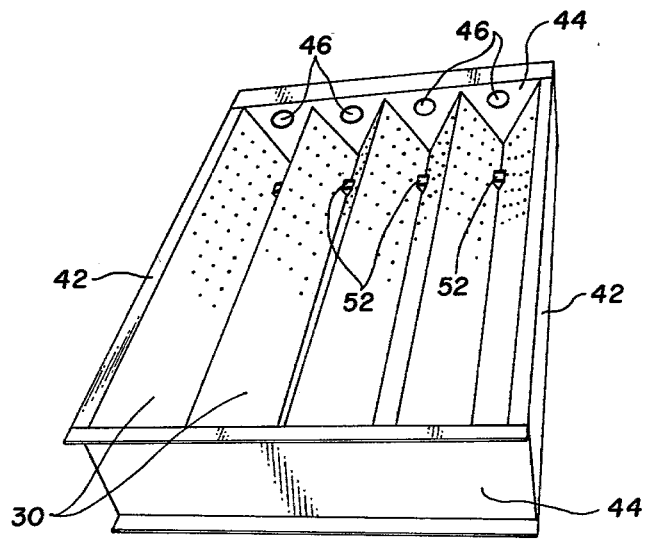
FIG. 6 is a lower perspective view thereof.
Figure 7:
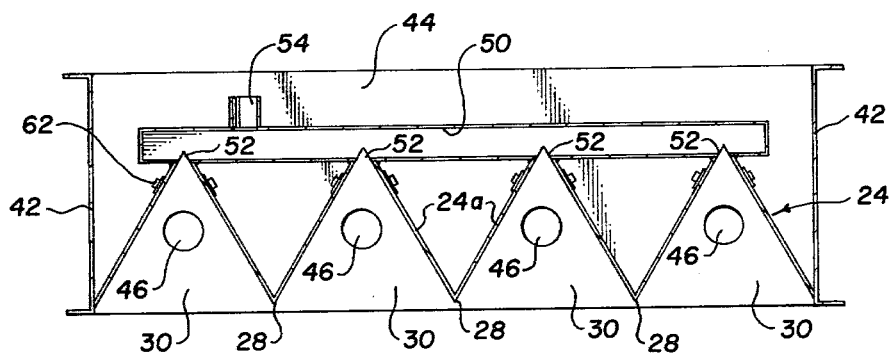
FIG. 7 is a cross-sectional view taken along line 7—7 of FIG. 5.
Figure 8:
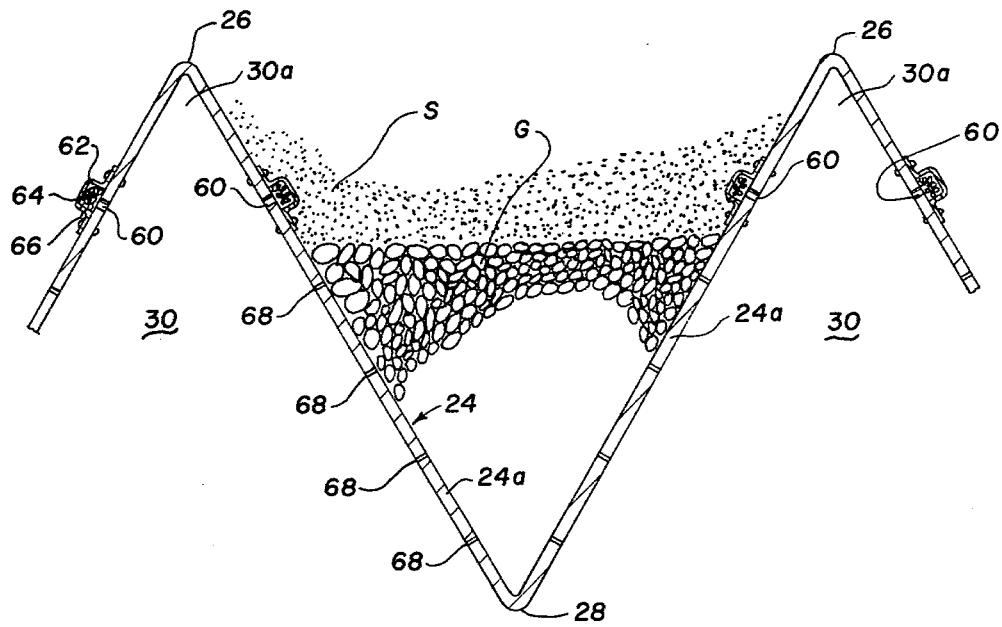
FIG. 8 is an enlarged cross-sectional view taken along line 8—8 of FIG. 5.

Referring to FIGS. 4-6 of the drawings, the underdrain 24 generally has sides 42 and ends 44.

One end 44 of the filter has a plurality of orifices 46 which communicates with each of the channels 30 formed by underdrain 24. Orifices 46 provides means to dampen and to control the flow of fluid into the channel 30 during the backwash cycle. The diameter of orifice 46 is such that the water is evenly distributed through the channel 30 thereby controlling the velocity and pressure of the water to prevent destruction of the bed during the backwash cycle.

As illustrated in FIGS. 2 and 3, the orifices 46 communicate with a cross channel 48 formed adjacent one end of bottom 18 transverse to channels 30 in tank 10 to carry fluid to the collection channel 14.

Means to supply air to the channels 30 generally comprises an air manifold 50 having openings 52 which communicate with openings in the peaks 26 of each of the channels 30. Manifold 50 is connected to the conduit 54 which is connected to a three-way valve 56 and a compressor pump 58. A vertical conduit 54 communicates with the outlet of the compressor 58 through valve 56 which is arranged to supply compressed air to manifold 50. However, when pump 58 is de-energized and valve 56 is vented, air will rise from the channels 30 into the manifold 50 and outlet 54. This prevents trapping of excessive air within the channels 30. The trapped air in upper channels 30a is forced out by rising water in channels 30.

The air is distributed along the upper channel 30a of peak 26 of the underdrain 24 and depresses the water level until the air reaches the outlet orifices 60. The orifices 60 are positioned along the lower edge of the layer of sand S. The cross-sectional area of the upper portion 30a is large enough to allow even distribution of the air and control the rate and the velocity of the air such that excessive air scouring at a single point is prevented. Orifices 60 communicate with the interior of hoods 62 which are packed with a means to limit movement of the sand into hoods 62 such as stainless steel wool material 64. An opening 66 is formed in the lower end of hoods 62 to allow escape of the air into the layer of sand S. The stainless steel wool material 64 provides a tortuous path which prevents water and sand from entering into openings 60. The liquid generally flows into the gravel G and out openings 68 formed at spaced intervals in the lower two-thirds of wall 24a of the filter support structure 24.

It should be appreciated that the air will not travel below outlet orifices 60 and that the filtered liquid will remain in the lower portion of channel 30.

Filtered liquid flows into channel 48 to collection channel 14 and through outlet 46. A three-way valve 70 controls flow into a holding tank through conduit 72. During the backwash cycle, a pump 74 is secured to a liquid supply conduit 76 which is connected to valve 70 through conduit 78 to supply backwash fluid into collection channel 14 and through the underdrain 24.

The materials collected in the mud channel 16 are pumped out by a pump 80 to a processing plant and for disposal.

Operation of the hereinbefore described invention is as follows:

Liquid to be filtered flows through inlet conduit 36 when valve 37 is opened to inner tank 12 over the filter bed.

The liquid flows downwardly through the filter bed and foreign particles are removed by the multiple layers of anthracite A and sand S.

Liquid flows into the gravel layer G, out of outlet openings 68 into channels 30 of underdrain 24. The liquid then after evenly distributing itself along the channel 30 flows out orifices 46 into cross channel 48 and into collection channel 14.

Liquid flows out outlet 40 through valve 70 into a holding tank.

After a predetermined time the filter bed will become clogged with foreign particles and must be backwashed to remove the excess matter.

Means is provided to initiate the backwash cycle such as a timer which would initially close valve 37 and energize pump 58 and close valve 56. The air compressor pump 58 will then supply air through supply conduit 54 to manifold 50. Air flows through manifold 50 into the peaks 26 of each of the channels 30 and is evenly distributed along the upper peak 30a of channel 30. The air forces the water level within channel 30 downwardly until the air is evenly distributed along the length of the channel 30. The air pushes downwardly until it reaches the level of outlet openings 60 and flows into the hoods 62 and out opening 66 at the lower portion thereof.

The air flows under pressure through the sand S and finer materials of the bed, air scouring the particles and lifting foreign matter to the surface of the liquid in inner tank 12. After a period of time pump 58 is de-energized and valve 56 is vented thus allowing air within the upper portion 30a of channel 30 to flow out manifold 50 and outlet 54 to remove excess air from channel 30.

Valve 70 is then energized to connect pump 74 with outlet conduit 40 to pump clear liquid from holding tank 14 through cross channel 48 and through orifices 46 and into channels 30. The water flows through outlet orifices 68, gravel G and up into the sand S and other filter media. The already suspended foreign particles are washed to the top of the liquid in tank 12 into backwash trough 30 and out opening 34. Valve 70 is de-energized to allow flow of effluent to the channel 14. The foreign particles collected in channel 16 are removed by energizing pump 80 to remove the sludge to a proper processing plant.

It should be appreciated that the pressure of the air delivered to conduit 54 is approximately 3 pounds per square inch; however, the pressure may vary with the size of the filter. By venting the air from the upper portion 30a of channel 30, it prevents air binding of the bed which would result if the liquid backwash were initiated without first bleeding the air from the peaks 26 of the channel 30. This would prevent proper filtering of the liquid through the bed once filtering was reinitiated.

Further, it should be appreciated that orifices 46 also prevented air from entering the cross channel 48 and the collection tank 14 which is undesirable.

The air scour cycle is initiated by a timer or other device for a predetermined period of time; for example, five minutes. After the air scour cycle, the backwash cycle is initiated for a predetermined period of time; for example, ten minutes, and de-energized by the timer.

Having described my invention, I claim:

1. A filter underdrain system for supporting a multilayered filter bed having a lower layer of coarse filter media and a layer of fine filter media disposed thereover to collect filtered liquid and to permit backwashing of the filter bed comprising: a corrugated filter underdrain forming a plurality of parallel channels having peaks formed by valley walls such that the coarse filter media is positioned between the valley walls below the peaks and the fine filter media disposed thereover, said filter underdrain having a plurality of air outlet openings formed in the upper portion of the valley walls adjacent the said peaks and communicating with the fine layer of filter media, said filter underdrain further having collection openings formed in the lower portion of the valley walls to collect filtered liquid from the layer of coarse filter media said collection openings being smaller than said air outlet openings such that liquid is evacuated from an upper portion of said channels before air escapes through said air outlet openings into the fine filter media; and air supply means communicating with the peaks of said channel, said air supply means being positioned above said peaks to permit removal of excess air within said channels to fill said channels with liquid.

2. The combination called for in claim 1 wherein the area of the air outlet openings in the valley walls is such that the rate of flow from the air outlet openings is equal to the flow rate of the air supply means.

3. The combination called for in claim 1 wherein the air supply means comprises: a vertically extending conduit; a manifold communicating with the upper portion of each of the peaks and with said vertically extending conduit; and air pump means operably secured to said vertically extending conduit.

4. The combination called for in claim 3 with the addition of: valve means associated with said vertically extending conduit, said valve means being adapted to allow compressed air from air pump means into said manifold and being adapted to vent said manifold after said backwash cycle is completed such that the air is removed from the upper portion of the peaks.

5. The combination called for in claim 1 with the addition of: end plates secured across said corrugated filter underdrain to form end walls of said channels, and an opening formed in at least one end wall in each of the channels, said opening adapted to restrict the flow of fluid to and from the channels to evenly distribute fluid along the length of the channel and across the bed area.

6. A method of air scouring and backwashing a multilayered filter having a first layer of coarse aggregate disposed between valley walls of a corrugated filter underdrain and a second layer disposed over the peaks of said underdrain and the first layer of the filter bed comprising the steps of: opening a valve to supply pressurized air into channels formed by the peaks of said corrugated underdrain to evacuate water from an upper portion of each channel to a level within the channels substantially equal to the level of the upper surface of the first layer of coarse filter media; dispersing pressurized air evenly along the length of the channels through passages into the lower portion of said second layer of said filter bed to disperse the air into said fine filter bed to dislodge foreign particles from said filter bed without disturbing the layer of coarse aggregate; closing said valve to terminate the supply air to said channels after a predetermined period of time; venting said channels to eliminate air in the upper portions of said channels; initiating a backwash cycle by pumping fluid into said channels below said filter bed such that the water is dispersed into the first layer of the filter bed and flows into the second layer of the filter bed to lift the suspended foreign particles upwardly until a predetermined period of time has elapsed; and collecting said foreign particles in a collection trough for a removal.

7. A filter underdrain system for supporting a multilayered filter bed having a lower layer of coarse filter media and a layer of fine filter media disposed thereover the underdrain system being adapted to collect filtered liquid and to permit backwashing of the filter bed comprising: a corrugated filter underdrain forming a plurality of parallel channels having peaks formed by valley walls such that the coarse filter media is positioned between the valley walls below the peaks and the fine filter media disposed thereover, said filter underdrain having a plurality of air outlet openings formed adjacent said peaks and communicating with the layer of fine filter media, a hood secured over each of said air outlet openings, said hood having an opening in the lower portion thereof; filter material disposed under said hood to restrict the flow of fluid and filter media into said air outlet opening, said filter underdrain further having collection openings formed in the lower portion of the valley walls to collect filtered liquid from the layer of coarse filter media; and air supply means communicating with the peaks of said channel, said air supply means being positioned above said peaks to permit the escape of excess air within said channels.

8. A filter comprising a tank; an influent inlet conduit; means to control flow through said influent inlet conduit; a corrugated filter underdrain forming a plurality of parallel channels having peaks formed by valley walls disposed in the lower portion of said tank; a layer of coarse filter media disposed between said valley walls of said filter underdrain below said peaks; a layer of fine filter media disposed over said peaks and over said coarse filter media to form a multi-layered filter bed; backwash collection means disposed in said tank;

an end wall formed across the open ends of said channels, said end wall having an opening formed which communicates with each of said channels to restrict the flow of backwash fluid into said channels to more evenly distribute the fluid along each of said channels; air supply means; means connecting said air supply means with said peaks of said channels to supply air for air scouring said filter during a cleaning cycle; a plurality of air outlet openings formed in the peaks of said channels, said air outlet openings disposed adjacent the lower level of said fine filter media such that the air is dispersed into said fine filter media and not the coarse filter media; and a hood secured over said air outlet openings, each said hood having an opening in the lower portion thereof; and a filter material disposed under each said hood to restrict the flow of fluid and filter media into said air outlet opening.

* * * * *